No. 785,034. PATENTED MAR. 14, 1905.
J. T. DUFF.
CAR WHEEL.
APPLICATION FILED SEPT. 28, 1904.
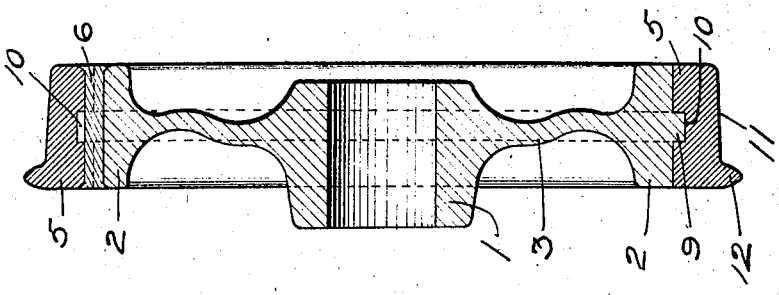
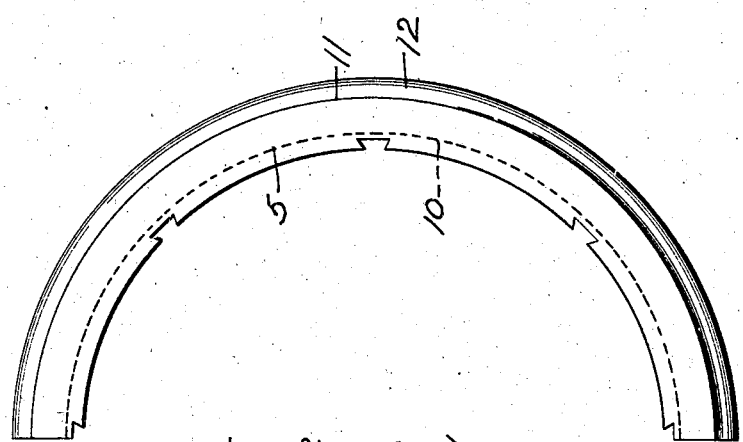
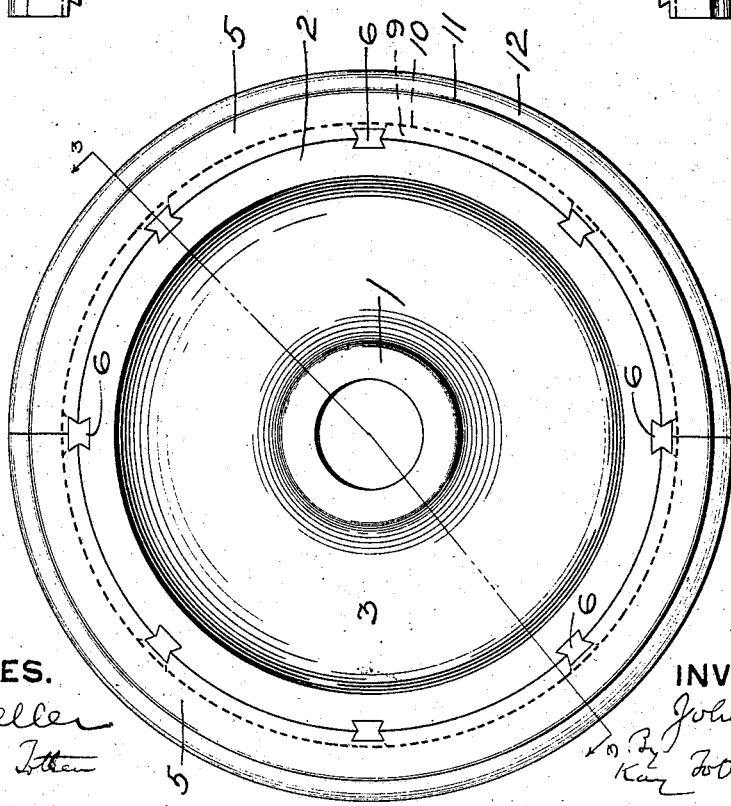
WITNESSES.
INVENTOR.
John T Duff No. 785,034. Patented March 14, 1905.

UNITED STATES PATENT OFFICE.

JOHN T. DUFF, OF PITTSBURG, PENNSYLVANIA, ASSIGNOR OF TWO-THIRDS TO WILLIAM H. LATSHAW, OF PITTSBURG, PENNSYLVANIA, AND JOSHUA RHODES, OF ALLEGHENY, PENNSYLVANIA.

CAR-WHEEL.

SPECIFICATION forming part of Letters Patent No. 785,034, dated March 14, 1905.

Application filed September 28, 1904. Serial No. 226,347.

*To all whom it may concern:*

Be it known that I, JOHN T. DUFF, a resident of Pittsburg, in the county of Allegheny and State of Pennsylvania, have invented a new and useful Improvement in Car-Wheels; and I do hereby declare the following to be a full, clear, and exact description thereof.

My invention relates to vehicle-wheels, and more especially to wheels for cars and the like, although the invention is not limited thereto, but may be applied to any vehicle-wheel.

The object of my invention is to provide a vehicle-wheel having a tread portion separate from the body thereof and so secured thereto that it can be easily removed or replaced in order that said tread portion can be renewed whenever damaged or worn.

The tread portion of vehicle-wheels is subjected to exceedingly hard wear, this portion of the wheel being the one which usually wears out first. Moreover, with certain vehicles, such as street-cars, the application of the brakes is liable to cause the wheels to slide or skid on the rails. This wears off the tread and produces what is known as "flat" wheels. Such wheels are very objectionable, not only making the car uncomfortable to ride in, but also causing the car-body and track to become racked. To overcome such flattened wheels, the practice heretofore has been to take the wheels from under the car and subject the same to a grinding or turning operation to again true the same. This is a slow expensive procedure and also makes it impossible to use the car while this work is going on. Another difficulty is that the repeated grindings of the wheel reduces the diameter thereof, so that the wheels are not all of the same size, thus causing the trucks to become askew. Car-wheels ordinarily are made in chill-molds, which give a hardened tread. The grinding of the tread to remove the flattened portion removes this hard chilled surface, so that softer metal is exposed and the liability of flattening is aggravated.

By my invention all of the foregoing difficulties are avoided.

The invention consists, generally stated, in providing a vehicle-wheel with a tread portion which is separate from the body, so that it can be made of very hard tough material and which is so secured to the body that it can be easily removed or replaced. When the tread portion becomes worn or flattened, it is only necessary to drive out a few keys and replace the worn portion by a perfect one. This operation requires very little time, involves little expense, and the car is not put out of use for any appreciable length of time.

The renewable tread can be formed of hard tempered steel, so that its wearing qualities are much greater than a chilled wheel, and as a consequence the flattening thereof is largely avoided.

In the accompanying drawings, Figure 1 is a side view of my car-wheel. Fig. 2 is a side view of one of the tread-sections detached from the wheel; and Fig. 3 is a vertical section on the line 3 3, Fig. 1.

My vehicle-wheel will comprise a body adapted for attachment to the shaft or axle and which will have a hub and rim portions connected in any suitable way, either by spokes or by a web. This body may be cast or may be formed of wrought metal, as preferred. In the drawings the invention is shown as applied to an ordinary webbed car-wheel having the body comprising a hub portion 1, a rim portion 2, and the web 3, this body preferably being formed by casting. The tread is separate from the body portion and is formed in two or more sections 5, two such sections being shown. This is for the purpose of permitting the easy manufacture of said rim portion and its ready attachment to and removal from the body portion. These tires or tread-sections will be attached to the body portion in any suitable way, but preferably by means of dovetailed keys 6, fitting in matching undercut grooves on the outer face of the body portion and inner face of the tread-sections. Any suitable number of such keys may be employed, the drawings showing eight; but this number obviously can be increased or diminished, according to the weight of the wheel and the uses to which it is to be subjected. These keys will have a close fit in the undercut grooves, and preferably will be very slightly tapered, so that they can be driven tightly into place. Any suitable means may be used, if necessary, to prevent the keys from working loose. In the drawings I have shown the ends of said keys slightly upset, this preventing them from working loose, but being so slight that said keys can nevertheless be driven out when necessary to renew the tread.

In order to keep the tread portion from slipping sidewise off the body, said tread and body are provided with coöperating projections and depressions, which may be mere bosses and similar depressions, but which preferably will be in the form of an annular rib 9 and coöperating annular groove 10, one being formed on the body and the other on the tread. The drawings show the rib on the body and the groove in the tread; but obviously these can be reversed.

The tread-face will be varied according to the character of vehicle-wheel. When used as a car-wheel, as shown in the drawings, it will be provided with the usual tread-face 11 and flange 12. For other forms of vehicles it may be flat or concave or convex, as desired.

The tread-sections will be formed of a hard durable metal, preferably steel. The sections can be made either by casting or by rolling a bar of the desired contour in cross-section, cutting said bar into suitable lengths, and then by means of a press or the like bending said sections into semi-annular shape to form the two sections of the tread. These tread-sections, after being bent to shape, can be tempered and hardened, so that they are exceedingly durable and will not readily wear away or become flattened even though the wheel should slip on the track.

A wheel constructed according to my invention can be used for a much longer time before flattening than wheels now in use. When the tread portion becomes worn or damaged from any cause, it can be renewed by merely driving out the keys 6 and replacing the worn section by a perfect one. This will require only a short time, and as a consequence the car will not be kept out of use for any appreciable time. The damaged sections may be, if desired, faced down and then again tempered and hardened for future use, or, if seriously damaged, they can be melted down and again cast or rolled to the desired form.

What I claim is—

1. A vehicle-wheel comprising a body adapted to be mounted on an axle or shaft, a removable and renewable tread secured to said body, and dovetailed keys driven into matching undercut slots in said body and tread and serving to secure the same together.

2. A vehicle-wheel comprising a body adapted to be mounted on an axle or shaft, a tread portion formed in several sections, dovetailed keys fitting in matching undercut slots in the body and tread-sections and serving to secure the same together, and means for preventing lateral displacement of the tread-sections.

3. A vehicle-wheel comprising a body adapted to be mounted on an axle or shaft, a tread portion formed in several sections, and dovetailed keys fitting in matching undercut slots in the body and tread-sections and serving to secure the same together.

4. A vehicle-wheel comprising a body adapted to be mounted on an axle or shaft, and a removable and renewable tread portion formed in several sections and secured to said body, said body and tread portions being provided with coöperating projections and depressions on their meeting faces to prevent lateral displacement of the tread-sections.

5. A vehicle-wheel comprising a body adapted to be mounted on an axle or shaft, and a removable and renewable tread portion formed in several sections and secured to said body, said body and tread being formed the one with an annular rib and the other with an annular groove coöperating with said rib and serving to prevent lateral displacement of the tread.

6. A vehicle-wheel comprising a body adapted to be mounted on an axle or shaft, a removable and renewable tread formed in several sections, said tread portion and body being provided with coöperating projections and depressions on their meeting faces to prevent lateral displacement of the tread, and dovetailed keys fitting in matching undercut slots in the body and tread-sections and serving to secure the same together.

In testimony whereof I, the said JOHN T. DUFF, have hereunto set my hand.

JOHN T. DUFF.

Witnesses:
ROBERT C. TOTTEN,
G. C. RAYMOND.